(12) United States Patent
Kang

(10) Patent No.: US 9,817,515 B2
(45) Date of Patent: Nov. 14, 2017

(54) METHOD FOR CORRECTING TOUCH INPUT POSITION ERROR AND DEVICE FOR SAME

(71) Applicant: ZINITIX CO., LTD., Gyeonggi-do (KR)

(72) Inventor: Hoai Sig Kang, Gyeonggi-do (KR)

(73) Assignee: ZINITIX CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/787,503

(22) PCT Filed: Nov. 5, 2014

(86) PCT No.: PCT/KR2014/010566
§ 371 (c)(1),
(2) Date: Oct. 28, 2015

(87) PCT Pub. No.: WO2015/080391
PCT Pub. Date: Jun. 4, 2015

(65) Prior Publication Data
US 2016/0259479 A1    Sep. 8, 2016

(30) Foreign Application Priority Data

Nov. 27, 2013    (KR) .......................... 10-2013-0145407

(51) Int. Cl.
*G06F 3/045*    (2006.01)
*G06F 3/041*    (2006.01)
*G06F 11/00*    (2006.01)
*G06F 3/044*    (2006.01)

(52) U.S. Cl.
CPC ............ *G06F 3/0418* (2013.01); *G06F 3/044* (2013.01); *G06F 11/00* (2013.01)

(58) Field of Classification Search
CPC ......... G06F 11/00; G06F 3/0418; G06F 3/044
See application file for complete search history.

(56) References Cited

U.S. PATENT DOCUMENTS

2011/0310038 A1    12/2011    Park et al.
2013/0057493 A1*    3/2013    Hwang .................. G06F 3/0418
                                                        345/173
2013/0181941 A1*    7/2013    Okuno .................... G06F 3/041
                                                        345/174

FOREIGN PATENT DOCUMENTS

KR    1020100044063    4/2010
KR    1020130028421    3/2013
KR    1020130109919    10/2013
WO    2012/092291 A2    7/2012

* cited by examiner

*Primary Examiner* — Insa Sadio
(74) *Attorney, Agent, or Firm* — Stuart H. Mayer; Mayer & Williams PC

(57) ABSTRACT

Disclosed is a method for determining a touch input position, comprising the steps of: receiving a table including possible combinations, which can be formed with capacitance change values at a plurality of touch nodes, and information mapped to the possible combinations; acquiring a first combination related to capacitance change values at the plurality of touch nodes, which are generated by a touch input; acquiring first information mapped to the first combination by searching the table on the basis of the first combination among the possible combinations; and determining an input position of the touch input by using the acquired first information.

10 Claims, 13 Drawing Sheets

[Figure 1]
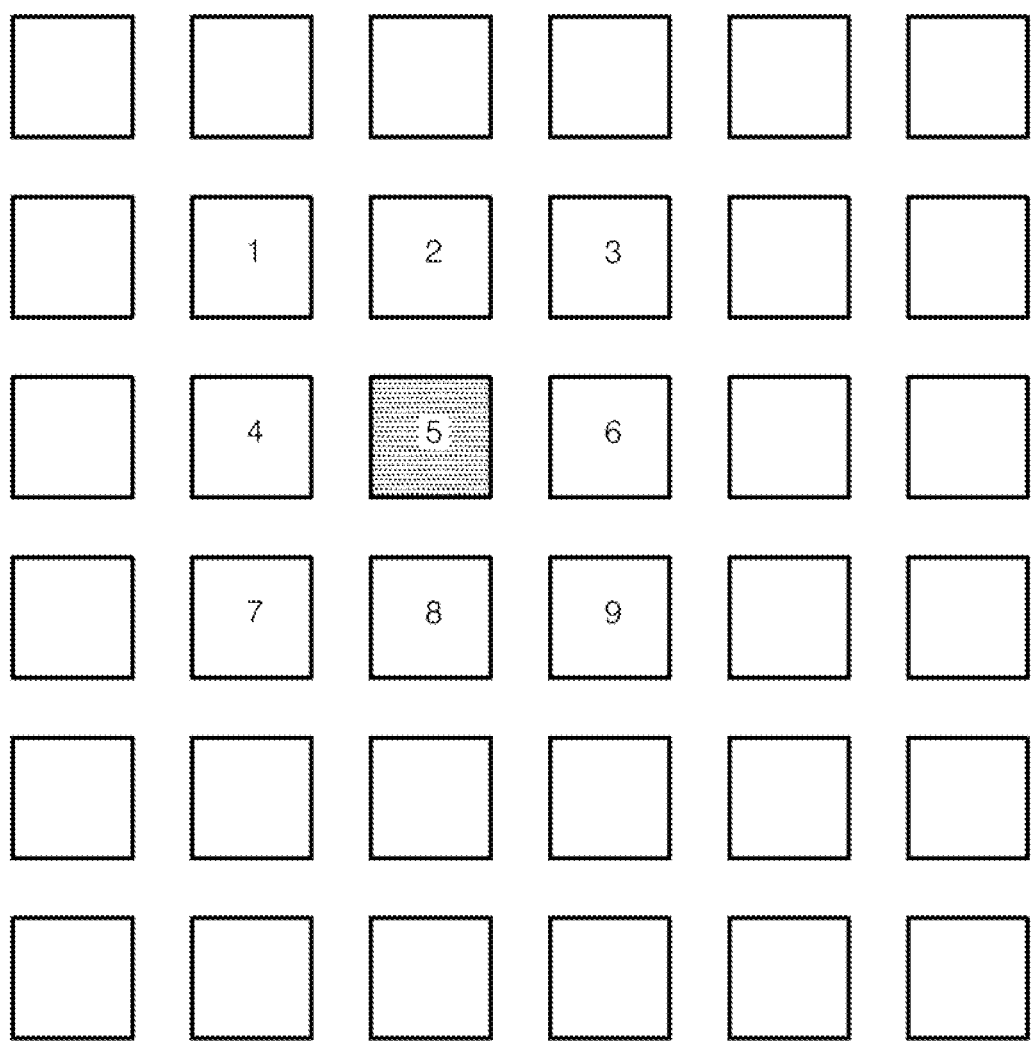

[Figure 2]
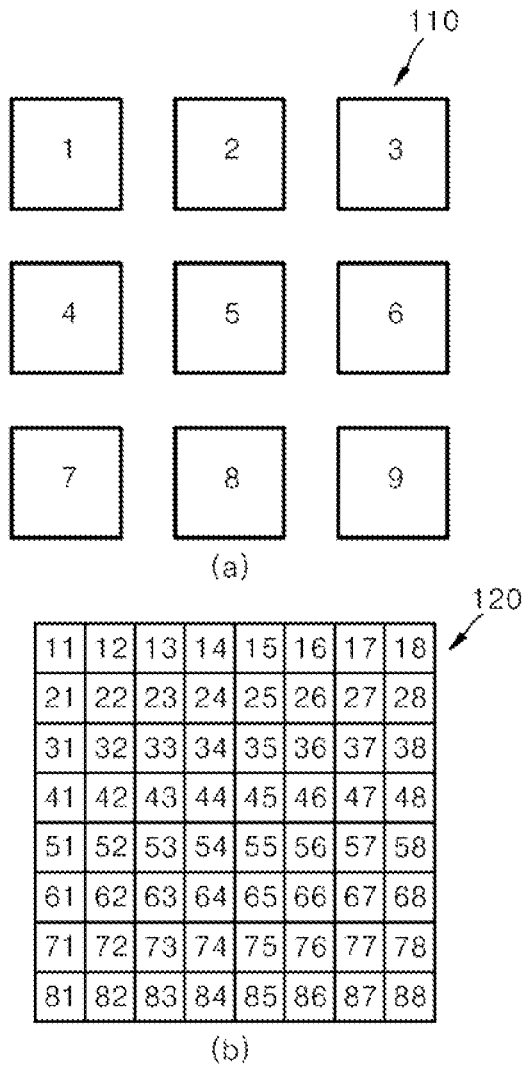
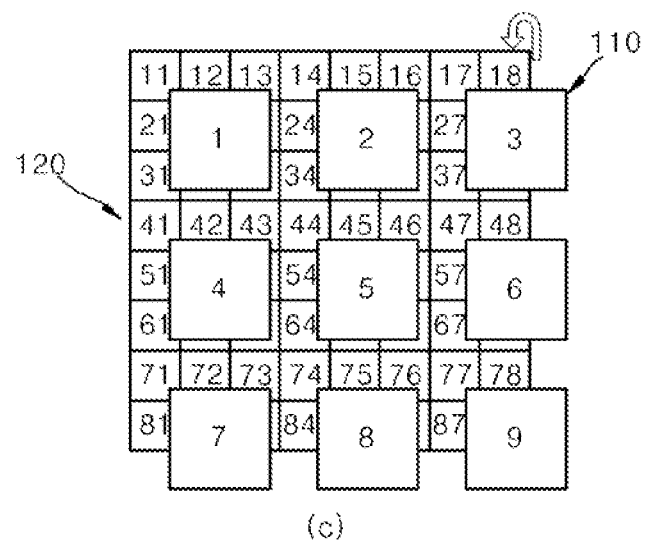

[Figure 3]
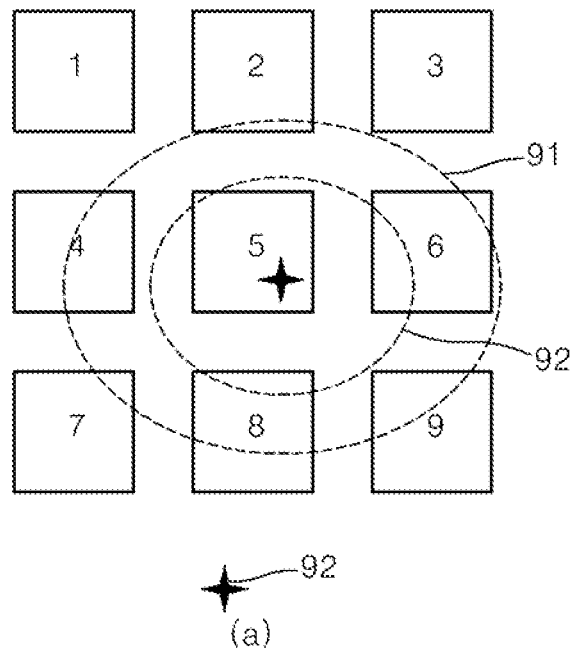
(a)
(b)

[Figure 4]

| CASE | TOUCH NODE INDEX | 1 | 2 | 3 | 4 | 5 | 6 | 7 | 8 | 9 | ACTUAL INPUT POSITION (DISPLAY PIXEL) |
|---|---|---|---|---|---|---|---|---|---|---|---|
| 1 | | 0 | 0 | 0 | 0 | 0 | 0 | 0 | 0 | 0 | NO |
| 2 | | 0 | 0 | 0 | 0 | 0 | 0 | 0 | 0 | 1 | 77 (OR 78 OR 87 OR 88) |
| 3 | | 0 | 0 | 0 | 0 | 0 | 0 | 0 | 0 | 2 | 77 (OR 78 OR 87 OR 88) |
| 4 | | 0 | 0 | 0 | 0 | 0 | 0 | 0 | 0 | 3 | 77 (OR 78 OR 87 OR 88) |
| 5 | | 0 | 0 | 0 | 0 | 0 | 0 | 0 | 1 | 0 | 74 (OR 75 OR 84 OR 85) |
| 6 | | 0 | 0 | 0 | 0 | 0 | 0 | 0 | 1 | 1 | 76 (OR 86) |
| 7 | | 0 | 0 | 0 | 0 | 0 | 0 | 0 | 1 | 2 | 76 (OR 77 OR 86 OR 87) |
| 8 | | 0 | 0 | 0 | 0 | 0 | 0 | 0 | 1 | 3 | 77 (OR 87) |
| ... | | | | | | | | | | | |
| ... | | | | | | | | | | | |
| ... | | | | | | | | | | | |
| ... | | | | | | | | | | | |
| ... | | | | | | | | | | | |
| ... | | | | | | | | | | | |
| ... | | | | | | | | | | | |
| ... | | | | | | | | | | | |
| 278 | | 0 | 0 | 0 | 0 | 1 | 1 | 0 | 1 | 1 | 66 |
| ... | | | | | | | | | | | |
| ... | | | | | | | | | | | |
| ... | | | | | | | | | | | |
| ... | | | | | | | | | | | |
| ... | | | | | | | | | | | |
| ... | | | | | | | | | | | |
| ... | | | | | | | | | | | |
| $4^9$ | | 3 | 3 | 3 | 3 | 3 | 3 | 3 | 3 | 3 | ENTIRE REGION TOUCH OR 44 OR 45 OR 54 OR 55 |

$\Delta C\_min=0$, $\Delta C\_max=3$, TOTAL OF 262,144 (= $4^9$) CASES

[Figure 5]

| CASE \ TOUCH NODE INDEX | 1 | 2 | 3 | 4 | 5 | 6 | 7 | 8 | 9 | ACTUAL INPUT POSITION (DISPLAY PIXEL) |
|---|---|---|---|---|---|---|---|---|---|---|
| 1 | 0 | 0 | 0 | 0 | 0 | 0 | 0 | 0 | 0 | NO |
| 2 | 0 | 0 | 0 | 0 | 0 | 0 | 0 | 0 | 1 | 77 OR 78 OR 87 OR 88 |
| 3 | 0 | 0 | 0 | 0 | 0 | 0 | 0 | 1 | 0 | 74 OR 75 OR 84 OR 85 |
| 4 | 0 | 0 | 0 | 0 | 0 | 0 | 0 | 1 | 1 | 76 OR 86 |
| 5 | 0 | 0 | 0 | 0 | 0 | 0 | 1 | 0 | 0 | 71 OR 72 OR 81 OR 82 |
| 6 | 0 | 0 | 0 | 0 | 0 | 0 | 1 | 0 | 1 | MULTI – TOUCH |
| 7 | 0 | 0 | 0 | 0 | 0 | 0 | 1 | 1 | 0 | 73 OR 83 |
| 8 | 0 | 0 | 0 | 0 | 0 | 0 | 1 | 1 | 1 | 74 OR 75 OR 84 OR 85 OR ENTIRE REGION TOUCH OF TOUCH NODES 7, 8 AND 9 |
| ... | | | | | | | | | | |
| 28 | 0 | 0 | 0 | 0 | 1 | 1 | 0 | 1 | 1 | 66 |
| ... | | | | | | | | | | |
| $2^9$ | 1 | 1 | 1 | 1 | 1 | 1 | 1 | 1 | 1 | ENTIRE REGION TOUCH OR 44 OR 45 OR 54 OR 55 |

$\Delta C\_min=0$, $\Delta C\_max=1$, TOTAL OF 512 (= $2^9$) CASES

[Figure 6]

| CASE | TOUCH NODE INDEX | ACTUAL MEASUREMENT VALUE | | | | | | | | | | CONVERTED VALUE | | | | | | | | | |
|---|---|---|---|---|---|---|---|---|---|---|---|---|---|---|---|---|---|---|---|---|---|
| | | 1 | 2 | 3 | 4 | 5 | 6 | 7 | 8 | 9 | | 1 | 2 | 3 | 4 | 5 | 6 | 7 | 8 | 9 | |
| 1 | | 0 | 0 | 0 | 0 | 0 | 0 | 0 | 0 | 0 | 0 | 0 | 0 | 0 | 0 | 0 | 0 | 0 | 0 | 0 | 0 |
| 2 | | 0 | 0 | 0 | 0 | 0 | 0 | 0 | 0 | + | 0 | 0 | 0 | 0 | 0 | 0 | 0 | 0 | 0 | + | 0 |
| 3 | | 0 | 0 | 0 | 0 | 0 | 0 | 0 | 0 | ++ | 1 | 0 | 0 | 0 | 0 | 0 | 0 | 0 | 0 | ++ | 0 |
| 4 | | 0 | 0 | 0 | 0 | 0 | 0 | 0 | 0 | +++ | 0 | 0 | 0 | 0 | 0 | 0 | 0 | 0 | 0 | +++ | 0 |
| 5 | | 0 | 0 | 0 | 0 | 0 | 0 | 0 | + | 0 | 1 | 0 | 0 | 0 | 0 | 0 | 0 | 0 | + | 0 | 0 |
| 6 | | 0 | 0 | 0 | 0 | 0 | 0 | 0 | + | + | 1 | 0 | 0 | 0 | 0 | 0 | 0 | 0 | + | + | 0 |
| 7 | | 0 | 0 | 0 | 0 | 0 | 0 | 0 | + | ++ | 0 | 0 | 0 | 0 | 0 | 0 | 0 | 0 | + | ++ | 0 |
| 8 | | 0 | 0 | 0 | 0 | 0 | 0 | 0 | + | 0 | 1 | 0 | 0 | 0 | 0 | 0 | 0 | 0 | + | 0 | 0 |
| ... | | | | | | | | | | | | | | | | | | | | | |
| 285 | | | | | | | | | | | | | | | | | | | | | |
| ... | | | | | | | | | | | | | | | | | | | | | |
| $4^9$ | | 0 | 0 | 0 | 0 | 0 | 0 | 0 | 0 | 0 | | 0 | 0 | 0 | 0 | 0 | 0 | 0 | 0 | 0 | |

$\Delta C\_min=0$, $\Delta C\_max=3$, TOTAL OF 262,144 ($=4^9$) CASES

[Figure 7]

[Figure 8]
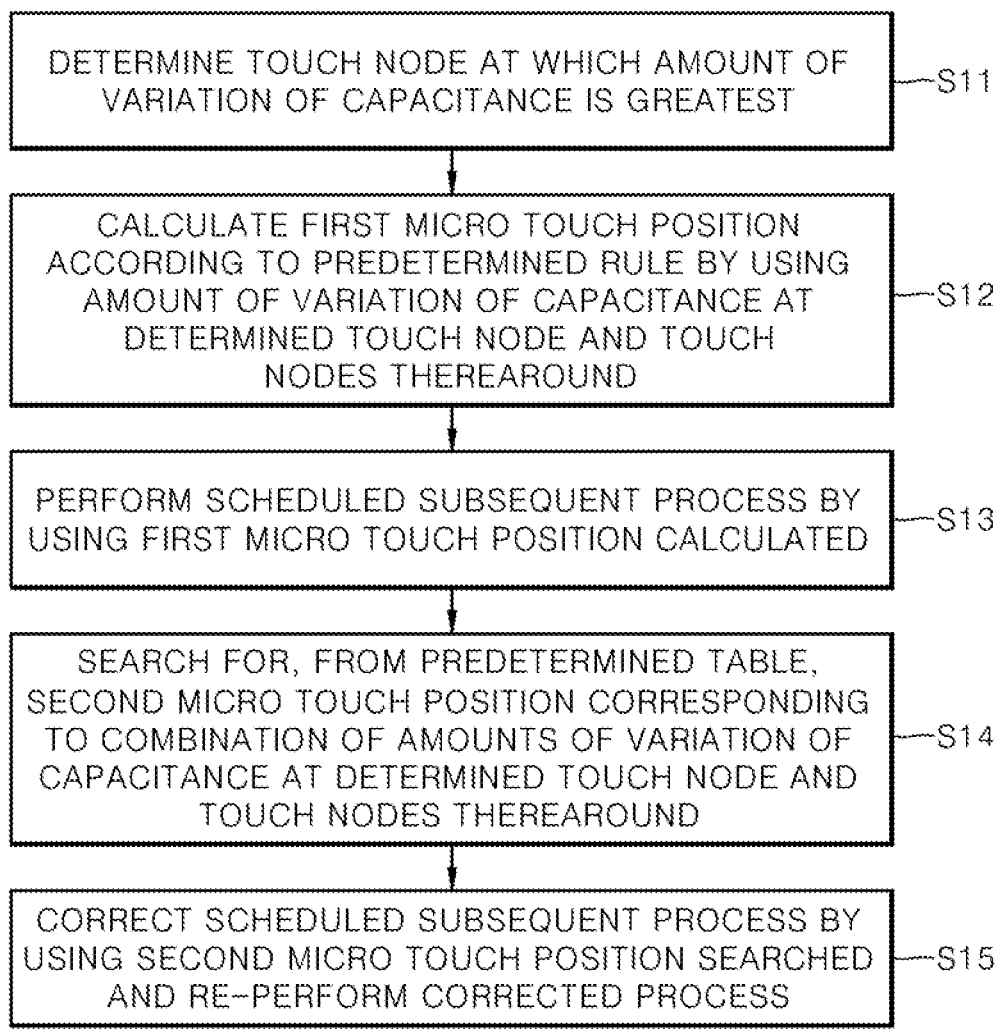

[Figure 9]
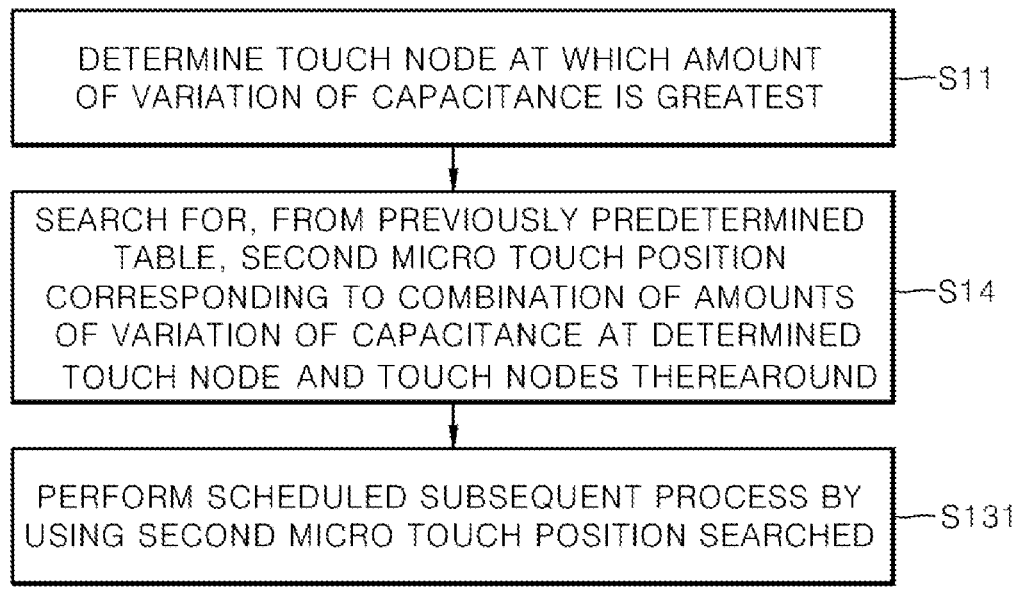

[Figure 10]
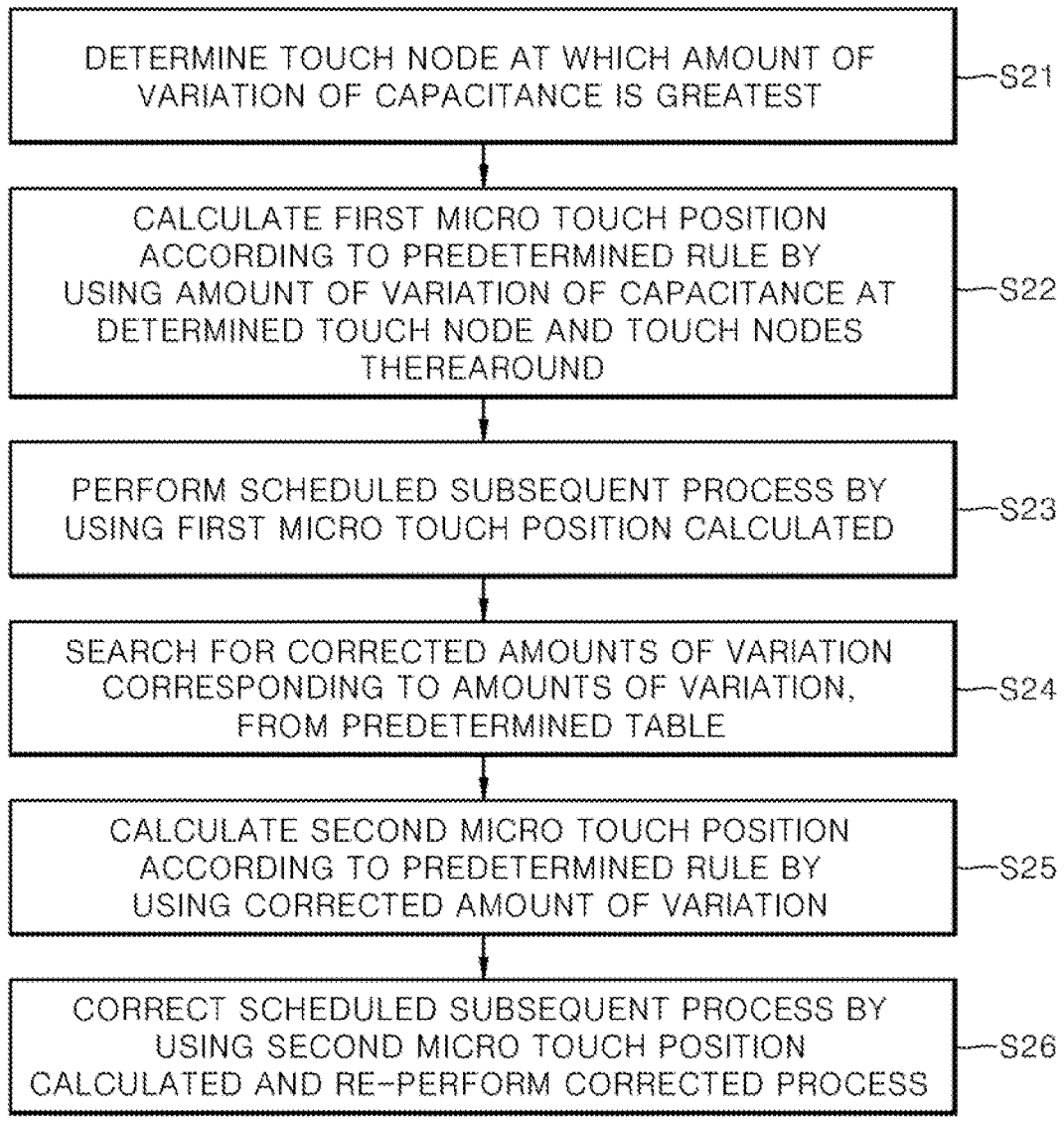

[Figure 11]
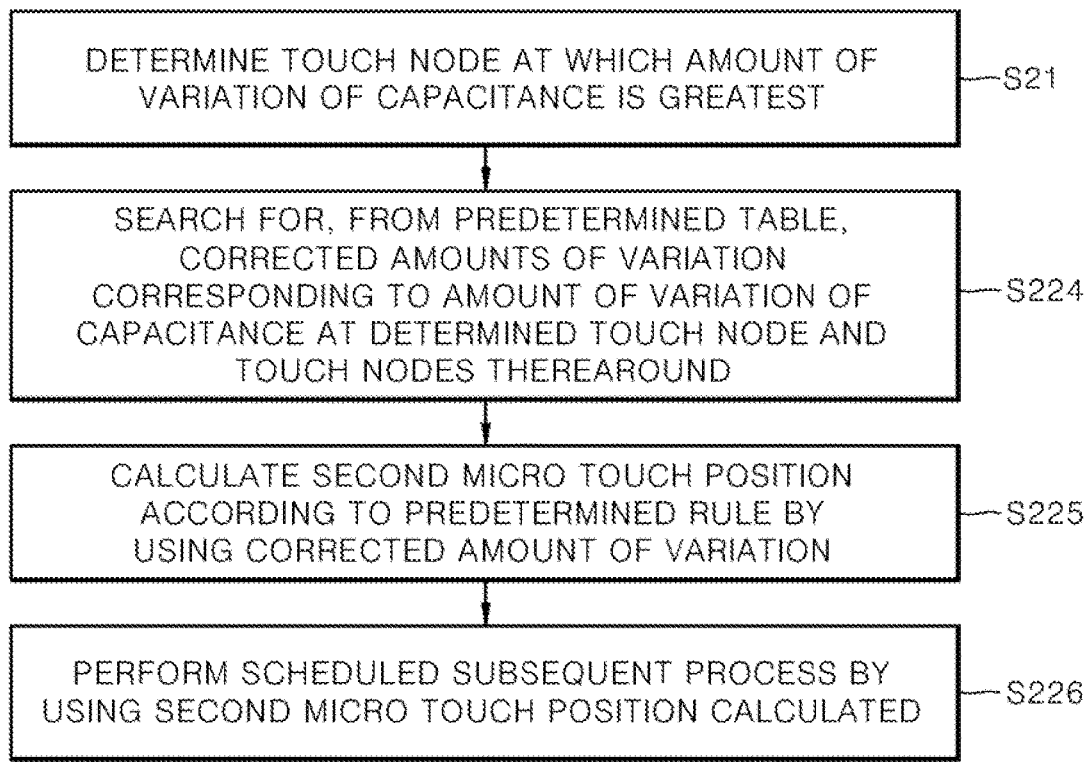

[Figure 12]
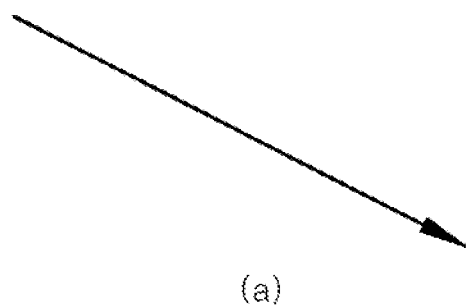
(a)
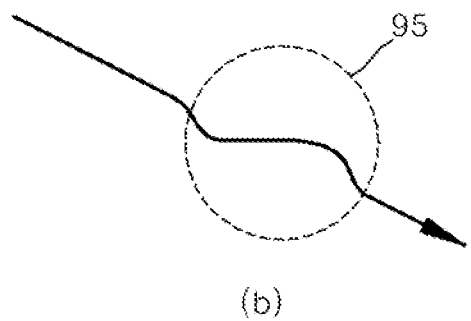
(b)

[Figure 13]
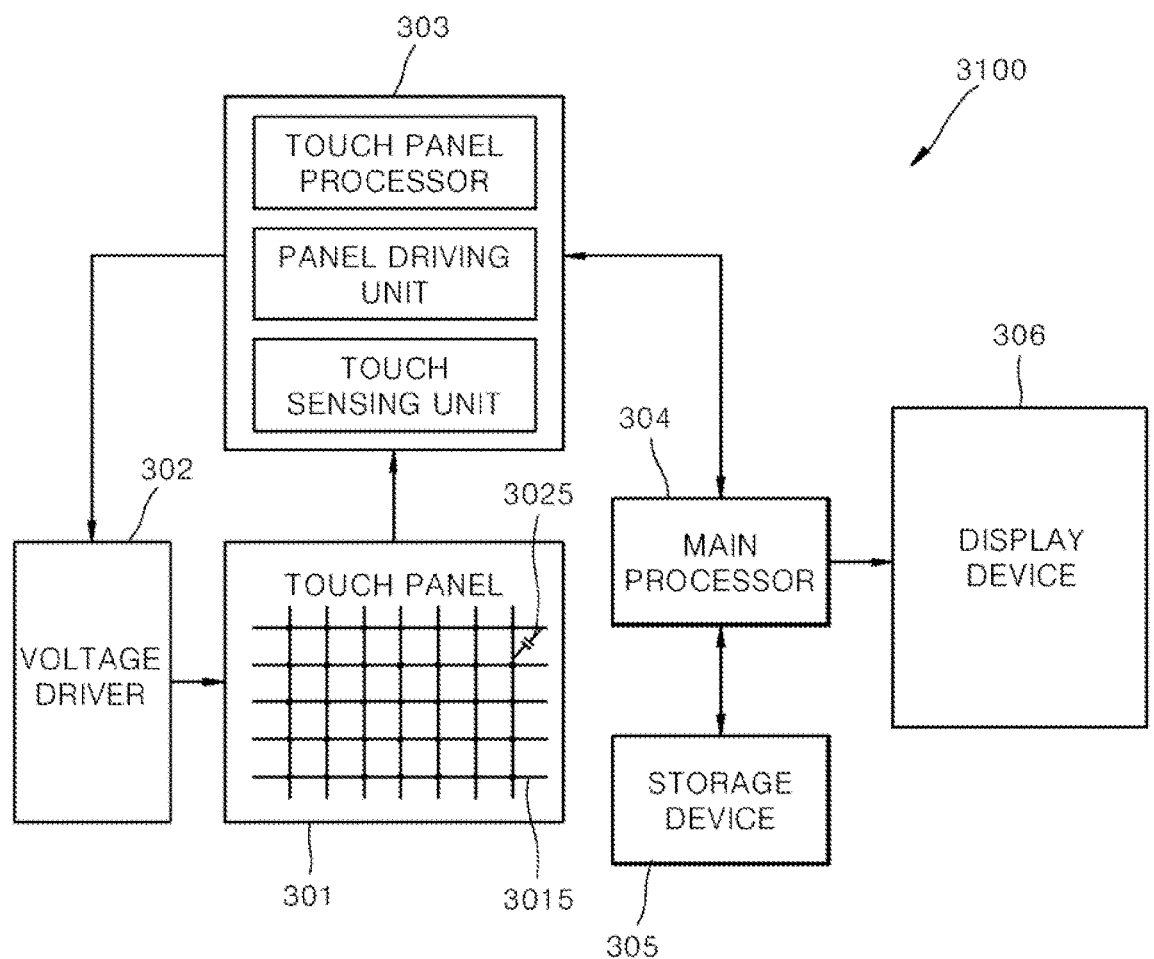

METHOD FOR CORRECTING TOUCH INPUT POSITION ERROR AND DEVICE FOR SAME

TECHNICAL FIELD

The present invention relates to correcting an error in a touch input position output from a capacitive touch input device.

BACKGROUND ART

A touch input device indicates an input device that senses the contact position of a finger or the like on a touch panel and provides information on the sensed contact position as input information. The touch panel of the touch input device may be installed to overlap with a display screen or provided separately from therefrom, and information on whether there is a contact and information on contact position may be used for the operation control and screen manipulation of a computer system on which the touch input device has been loaded. There are various types of touch input devices—the representative types being resistive and capacitive types. The capacitive type is largely a self-storage mode and a mutual storage mode.

The mutual storage mode has an operating electrode and a sensing electrode that are made of a transparent conductive material, and a capacitance may be formed between the two electrodes. Usually, directions in which the operating electrode and the sensing electrode are extended are different from each other and in some embodiments, the two electrodes may be perpendicular to each other. The capacitance may be formed between the sensing electrode and the operating electrode and especially, most capacitance may be formed at the intersection region of the two electrodes. Such an intersection region may be collectively referred to as a 'touch node' or 'node' in the present disclosure. Since a single touch panel provides one or more operating electrodes and one or more sensing electrodes, there may be one or more touch nodes that have been described above.

When a finger approaches or makes contacts with the touch node, the value of the capacitance at the touch node varies. Thus, when measuring a variation in the capacitance value at the touch node, it is possible to find whether the finger has made contact with the touch panel.

To this end, when applying an operating signal to the operating electrode, a charge is injected into the sensing electrode. Since an amount of injected charge varies according to the value of the capacitance between the two electrodes, it is possible to find a variation in capacitance by measuring the amount of the injected charge and thus it is possible to find whether a touch input has been performed.

Many operating electrodes and many sensing electrodes may be disposed on the touch panel and these electrodes are connected to operating circuits and sensing circuits, respectively. For the connection, operating lines and sensing lines are connected to the operating electrodes and the sensing electrodes. Each operating line and sensing line may be designed so that they are electrically isolated from each other. When the operating electrode and the sensing electrode are disposed on the same layer, various structures may be presented in order to insulate the operating lines and the sensing lines from each other. In the present disclosure, the operating line and the sensing line may be collectively referred to as lines.

The detailed operating principle of the touch panel having the mutual storage mode is disclosed in Korean Patent Laid-Open No. 10-2013-0109919, published on Oct. 8, 2013, in which FIGS. 2a to 2C, and 3a describe that an amount of variation of the capacitance at the touch node according to a variation in touch input coordinate fails to maintain linearity about a variation in the touch input coordinate. Such non-linearity works as a limitation in calculating an accurate touch input position. Also, FIG. 4a in Korean Patent Laid-Open No. 10-2013-0109919 shows a particular example related to the disposition of the sensing electrodes, the operating electrodes, and the lines, in which a region occupied by the lines may be referred to as a 'dead zone'. The density of the lines disposed in such a dead zone varies according to the position of the dead zone and thus there is a limitation in that the above-described linearity required for the detection of the accurate touch input position worsens due to such non-uniformity of patterns.

The concept of the 'touch node' described in the present disclosure is disclosed in Korean Patent Laid-Open No. 10-2013-0109919, the entire contents of which are hereby incorporated by reference.

DISCLOSURE OF THE INVENTION

Technical Problem

Embodiments provide a method and device for correcting a touch input position error that is caused because an amount of variation of the capacitance of a touch node according to a touch position on a touch panel has non-linearity.

Technical Solution

In one embodiment, a method of determining a touch input position includes obtaining a table including possible combinations including capacitance variation values at a plurality of touch nodes and information mapped to the possible combinations; obtaining a first combination related to the variation values of the capacitance at the plurality of touch nodes generated by a touch input; searching for the first combination among the possible combinations to obtain first information mapped to the first combination; and determining the touch input position by using the first information obtained.

The plurality of touch nodes may include a single central touch node and one or more surrounding touch nodes adjacent to the central touch node, wherein the central touch node is a touch node at which an amount of variation of capacitance is the greatest, among the plurality of touch nodes.

Each piece of information mapped to each of the possible combinations may be a coordinate of the touch input position.

Each piece of information mapped to each of the possible combinations may be a capacitance variation value corrected from a capacitance variation value configuring each combination.

In another embodiment, a touch input position determination method by which a touch input position is determined on a touch panel including a plurality of touch nodes includes obtaining a first combination related to variation values of capacitance at a central touch node and one or more surrounding touch nodes around the central touch node; obtaining first information mapped to the first combination from a table including possible combinations including capacitance variation values at the central touch node and the surrounding touch nodes and information mapped to the possible combinations; and determining a touch input position by using the first information obtained.

In yet another embodiment, a device for determining a touch input position includes a sensing unit configured to obtain a variation value of capacitance at a plurality of touch nodes; and a processor configured to provide a touch input position by using a result obtained from the sensing unit.

The processor is configured to obtain a table including possible combinations including capacitance variation values at the plurality of touch nodes and information mapped to the possible combinations; obtain a first combination related to the variation values of the capacitance at the plurality of touch nodes generated by a touch input; search for the first combination among the possible combinations to obtain first information mapped to the first combination; and determine the touch input position by using the first information obtained.

Advantageous Effects

According to the present invention, it is possible to provide a method and device for correcting a touch input position error that is caused because an amount of variation of the capacitance of a touch node according to a touch position on a touch panel has non-linearity.

BRIEF DESCRIPTION OF THE DRAWINGS

FIG. 1 represents an arrangement example of touch nodes that are arranged on a touch panel according to an embodiment of the present invention.

FIGS. 2a to 2c compare the touch input resolution of a touch panel used in an embodiment of the present invention with the display resolution of a display device coupled to the panel.

FIGS. 3a and 3b describe when a position corresponding to one 55 of display pixels represented by the display device coupled to the touch panel as described in FIGS. 2a to 2c is selected to perform an input.

FIG. 4 represents the number of combination cases of an amount of variations of capacitance that may be output from a set of touch nodes as described above in an embodiment of the present invention.

FIG. 5 is a variation to FIG. 4 and represents when a variation to a 1 bit resolution has been performed in order to decrease the search time of a table even though a value representing an amount of variation of capacitance at each touch node is actually provided as a e.g., 2 bit resolution.

FIG. 6 represents an example of a table provided for another embodiment of the present invention.

FIG. 7 is a variation to FIG. 6 and represents when a variation to a 1 bit resolution has been performed in order to decrease a table search time even though a value representing an amount of variation of capacitance at each touch node is actually provided as a e.g., 2 bit resolution.

FIG. 8 is a flowchart of a method of determining a touch input position according to an embodiment of the present invention.

FIG. 9 is a variation to the flowchart of FIG. 8 and may be applied when a search time consumed to search for a corresponding case from the table of FIG. 4 is sufficiently short and thus it is possible to perform a subsequent process in real time.

FIG. 10 is a flowchart of a method of determining a touch input position according to another embodiment of the present invention.

FIG. 11 is a variation to the flowchart of FIG. 10 and may be applied when a search time consumed to search for a corresponding case from the table of FIG. 6 is sufficiently short and thus it is possible to perform a subsequent process in real time.

FIG. 12 is a diagram for explaining the effect of a method of determining a touch input position according to an embodiment of the present invention.

FIG. 13 represents an example of an electronic device using a conductor pattern according to an embodiment of the present invention.

MODE FOR CARRYING OUT THE INVENTION

In the following, embodiments of the present invention are described in detail with reference to the accompanying drawings so that a person skilled in the art to which the present invention pertains to may easily practice. However, the present invention may be implemented in many different forms and is not limited to embodiments that are described herein. The terms used herein are just intended to mention specific embodiments and not intended to limit the present invention. Also, singular terms used herein also include plural forms unless referred to the contrary. The accompanying drawings are partially exaggerated or reduced for the convenience of description and the scale of each part of a component in the accompanying drawings may vary when embodiments of the present invention are actually implemented.

FIG. 1 represents an arrangement example of touch nodes that are arranged on a touch panel according to an embodiment of the present invention.

In this example, the touch nodes are arranged in the form of a 6*6 matrix but a matrix form is not limited thereto. In a method of detecting a touch input position according to an embodiment of the present invention, a touch node at which an amount of variation of capacitance is the greatest among all touch nodes is determined. Next, the touch input position may be more precisely calculated by using amounts of variation of the capacitance of the central touch node and one or more surrounding touch nodes adjacent to the central touch node. The example in FIG. 1 represents when a touch node 5 present on 3rd row and 3rd column is selected as the central node, and it is possible to use amounts of variation of the capacitance of the central touch node 5 and eight surrounding touch nodes 1 to 4 and 6 to 9 adjacent thereto. The present disclosure may refer to the central touch node and the one or more surrounding touch nodes adjacent to thereto as a 'set of touch nodes' or a 'touch node set', collectively.

In the example in FIG. 1, since only one of all touch nodes is selected, a set of touch nodes is observed but when multi-touch is supported, it is also possible to observe two or more sets of touch nodes by selecting two or more central touch nodes, such as a first central touch node and a second central touch node.

FIGS. 2a to 2c compare the touch input resolution of a touch panel used in an embodiment of the present invention with the display resolution of a display device coupled to the panel. In the following, descriptions are provided with reference to FIGS. 2a to 2c.

In FIG. 2a, reference numerals 1 to 9 represents the shape and size of a region for which each of the central touch node 5 and the surrounding touch nodes 1 to 4 and 6 to 9 is responsible in a touch panel according to an embodiment of the present invention, and the relative position between nine touch nodes. In this example, the nine touch nodes in FIG. 2a may be obtained by selecting some of sets of all touch nodes in FIG. 1.

FIG. 2b represents the size of display pixels 11 to 18, 21 to 28, 31 to 38, . . . , 81 to 88 (hereinafter, referred to as 11 to 88) in some display regions coupled to the set of touch nodes in FIG. 1a, in the display device coupled to the touch panel, and the relative disposition of the display pixels.

As represented in FIG. 2c, the touch nodes 1 to 9 may be disposed on the display device. In this case, since the touch nodes are made up of transparent electrodes that it is difficult to observe with naked eyes, human beings may not see the touch node and observe only light that the underlying display device emits.

In the example in FIGS. 2a to 2c, it is assumed that each of the display pixels 11 to 88 has ¼ of the size of one touch node and the touch nodes are spaced by the width of the display pixel. The spaces between the touch nodes are referred to also as so called 'dead zones', in which lines connected to a sensing electrode and an operating electrode that form each touch node may be disposed. The sensing electrode, the operating electrode, and the lines may be disposed on the same or different layers. In another embodiment of the present invention, e.g., 100 (=10*10) display pixels may also correspond to one touch node. That is, the resolution of display pixels may be much higher in comparison to the resolution of a touch node. For the convenience of description, the example of FIGS. 2a to 2c illustrates that a total of four (=2*2) display pixels correspond to one touch node.

FIGS. 3a and 3b describe when a position corresponding to one 55 of display pixels represented by the display device coupled to the touch panel as described in FIGS. 2a to 2c is selected to perform an input.

When a user observing the display device touches a tool such as a finger to the display device in order to select the display pixel 55, the tool may cover a portion or whole of each of the touch nodes 1 to 9. In this case, a cover region 91 may be modeled in an ellipse or circle. In FIG. 3a, the size of an amount of variation of the capacitance of each of touch nodes 1 to 9 may be related to an area that covers each touch node. The size of an amount of variation of the capacitance of each touch node may be linearly proportion to the area that the tool covers each touch node. In FIG. 3a, the size of the amount of variation of the capacitance of each touch node may be greatest at the touch node 5 and may be in the order of touch node 6, touch node 8, touch 4, touch node 9, touch node 2, touch node 3, and touch node 1.

In this case, when a touch point is determined by using the simplest method, it is possible to determine that a touch input has been performed on the touch node 5 at which the amount of variation of capacitance is the greatest, in which case it is possible to determine that all of display pixels 44, 45, 54 and 55 corresponding to the touch node 5 have been selected. The reason why it is determined that all of the display pixels 44, 45, 54 and 55 have been selected even though a user has actually selected the display pixel 55 is that a touch input resolution is lower than a display resolution. In order to increase the touch input resolution, amounts of variation of a capacitance value detected from the touch node set are used. To this end, it is possible to use Equation 1 below:

Touch input position $= f(\Delta C$ values at touch node showing greatest $\Delta C$ variation and surrounding touch nodes around touch node)

$= f(\Delta C1, \Delta C2, \Delta C3, \Delta C4, \Delta C5, \Delta C6, \Delta C7, \Delta C8, \Delta C9)$  <Equation 1> where $\Delta Ck$ (k=1 to 9) is an amount of variation of capacitance from a reference capacitance value at each touch node.

That is, it is possible to precisely calculate a touch input position by using amounts of variation of capacitance at a plurality of touch nodes as independent variables as in Equation 1. In order to accurately derive the result of Equation 1, the amount of variation of capacitance at each touch node needs to be linearly proportion to the area that the tool covers each touch node but it is not actually proportion thereto. The reason is that the distribution of a line of electric force inducing a variation of capacitance at each touch node is not uniform in each touch node and the characteristic of the dead zone is non-uniform over the entire region of the touch panel. In order to solve such a limitation, a technology to design the shape of the pattern of sensing and operating electrodes that form each touch node and technologies related to the shape of the dead zone and the disposition of the lines in the dead zone are being studied but in spite of such studies, the above-described limitation has not been completely solved.

Embodiment 1

In order to solve such a limitation, an embodiment of the present invention uses a specific one of display pixels or a plurality of adjacent display pixels as 'target display pixels' to actually measure an amount of variation of capacitance at touch nodes around the target display pixels when a touch input is performed on the target display pixels, and stores the amount of variation in a tabular form.

In this case, when the display pixel 55 is selected as the target display pixel as in the example in e.g., FIGS. 3a and 3b, there may be one or more combinations of amounts of variation of capacitance at the touch node sets around the display pixel 55. For example, a first touch that has been input to select the same display pixel 55 may cover the region 91 and a second touch may cover the region 92. In this case, it is predicted that a value of variation of capacitance at the touch nodes 2 to 9 is zero or greater under the first touch but it is predicted that capacitance will vary only at the touch nodes 5, 6 and 8 under the second touch. From the above examples, it may be understood that one or more combinations of amounts of variation of capacitance at the touch node sets may be for a specific target display pixel.

An example of the table is described through FIG. 4.

FIG. 4 represents the number of combination cases of an amount of variation of capacitance that may be output from a set of touch nodes as described above in an embodiment of the present invention.

Each column represents the index of each touch node of the set of touch nodes around a target display pixel on which a touch input has been performed, and uses the example in FIG. 3a.

Each row represents all cases that nine touch nodes present in the set of touch nodes may output. The number of all cases in which the output may be performed is associated with the detection resolution of an amount of variation of capacitance output from each touch node. The detection resolution may be associated with the performance of an AD converter present in a detection unit. In another embodiment of the present invention, although the resolution of an amount of variation of capacitance output from each touch node may be represented as e.g., 5 bits but the table of FIG. 4 illustrates as having a 2-bit resolution for the convenience of description. Thus, in FIG. 4, the minimum value of an amount of capacitance variation ΔC is zero, the maximum value thereof is 3 and the number of the cases is 262,144 (=4^9).

The number at the intersection of each column and each row in FIG. 4 represents an amount of capacitance variation actually measured at a corresponding touch node. Referring to the table of FIG. 4 along with FIG. 3, it is possible to see that amounts of capacitance variation at the touch nodes 1 to 9 are actually measured as {0, 0, 0, 0, 0, 0, 0, 1, 2}, respectively when a touch input is actually performed by using a display pixel 76 as a target display pixel (in case 7). Also, it is possible to see that amounts of capacitance variation at the touch nodes 1 to 9 may be found through a plurality of cases, such as cases 1 to 3 when a touch input is actually performed by using a display pixel as a target display pixel. As another example, it is possible to see that amounts of capacitance variation at the touch nodes 1 to 9 are actually measured as {0, 0, 0, 0, 1, 1, 0, 1, 1}, respectively when a touch input is actually performed by using a display pixel 66 as a target display pixel (in case 278).

When amounts of capacitance variation at each touch node obtained by actually performing a touch input on each display pixel are stored in a tabular form as in FIG. 4, the number of all cases that e.g., nine touch nodes in FIG. 3a may output may be provided. Thus, when any combination of amounts of capacitance variation for nine touch nodes are subsequently output, it is possible to find the combination from the table of FIG. 4 to output a particular touch input position with the resolution of a display pixel level.

FIG. 5 is a variation to FIG. 4 and represents when a variation to a 1 bit resolution has been performed in order to decrease a table search time even though a value representing an amount of capacitance variation at each touch node is actually provided as a e.g., 2 bit resolution. As could be inferred from FIGS. 4 and 5, the number of all cases provided by the table as described above may be determined according to the resolution of a value representing an amount of capacitance variation at each touch node and the number of surrounding touch nodes coupled to the one central touch node as described above. The table in FIG. 5 may provide a total of 256 cases.

The tables in FIGS. 4 and 5 need to be predetermined by actually measuring the output characteristic of the touch panel predetermined.

Embodiment 2

Another embodiment of the present invention uses Equation 1 as described above. However, it is possible to provide a value provided as an independent variable in Equation 1 by using an actual measurement value according to the following method.

FIG. 6 represents an example of a table provided for another embodiment of the present invention. In the following, descriptions are provided with reference to FIGS. 3a, 3b, and 6.

FIG. 6 assumes that a value representing an amount of variation of capacitance at each touch node is provided as a 2 bit resolution and assumes that a total of nine touch nodes configure the set of touch nodes as in FIG. 3a. In this case, the number of possible cases is 262,144 (=4^9).

In this case, the function f( ) in Equation 1 may be optimized according to the disposition and electrical characteristic of touch nodes provided in FIG. 3a. Thus, the position of a display pixel on which a touch input has been performed may be accurately specified in most of a total of 262,144 cases when an output value related to an amount of capacitance variation at the set of touch nodes is input to the function ( ).

However, the following phenomenon may be represented because the electrical characteristic of the touch node set represents non-linearity. For example, although an actual touch input position in case 285 is the display pixel 55, actual measurement values at the touch nodes 1 to 9 in FIG. 3a may be represented by {0, 0, 0, 0, 1, 1, 0, 1, 1}. If it is determined that a touch input position is a display pixel 66 when values {0, 0, 0, 0, 1, 1, 0, 1, 1} are input to f( ) as independent variables and it is represented that the touch input position is the display pixel 55 when values {0, 0, 0, 0, 1, 1, 0, 1, 0} are input as the independent variables, the mapping relation of actually measured {0, 0, 0, 0, 1, 1, 0, 1, 1} to {0, 0, 0, 0, 1, 1, 0, 1, 0} may be stored as in Table 6 and used. In this case, when a touch input is performed by actually using e.g., the display pixel 55 as a target position, (1) {0, 0, 0, 0, 1, 1, 0, 1, 1} are output at nine touch nodes in FIG. 3a, but (2) after conversion of {0, 0, 0, 0, 1, 1, 0, 1, 1} into {0, 0, 0, 0, 1, 1, 0, 1, 0} in the table in FIG. 6, (3) values {0, 0, 0, 0, 1, 1, 0, 1, 0} obtained through conversion are input to f( ) and thus it may be determined that a touch input position is the display pixel 55. The table in FIG. 6 needs to be predetermined by actually measuring the characteristic of a touch panel predetermined.

The example in FIG. 6 assumes that an accurate touch input is derived when amounts of variation of capacitance actually measured in cases 1 to 8 are input to f( ). When there is no need to correct an amount of variation of capacitance actually measured and store the corrected values, records such as cases 1 to 8 in FIG. 6 do not need to be stored in a table.

Figure 7:
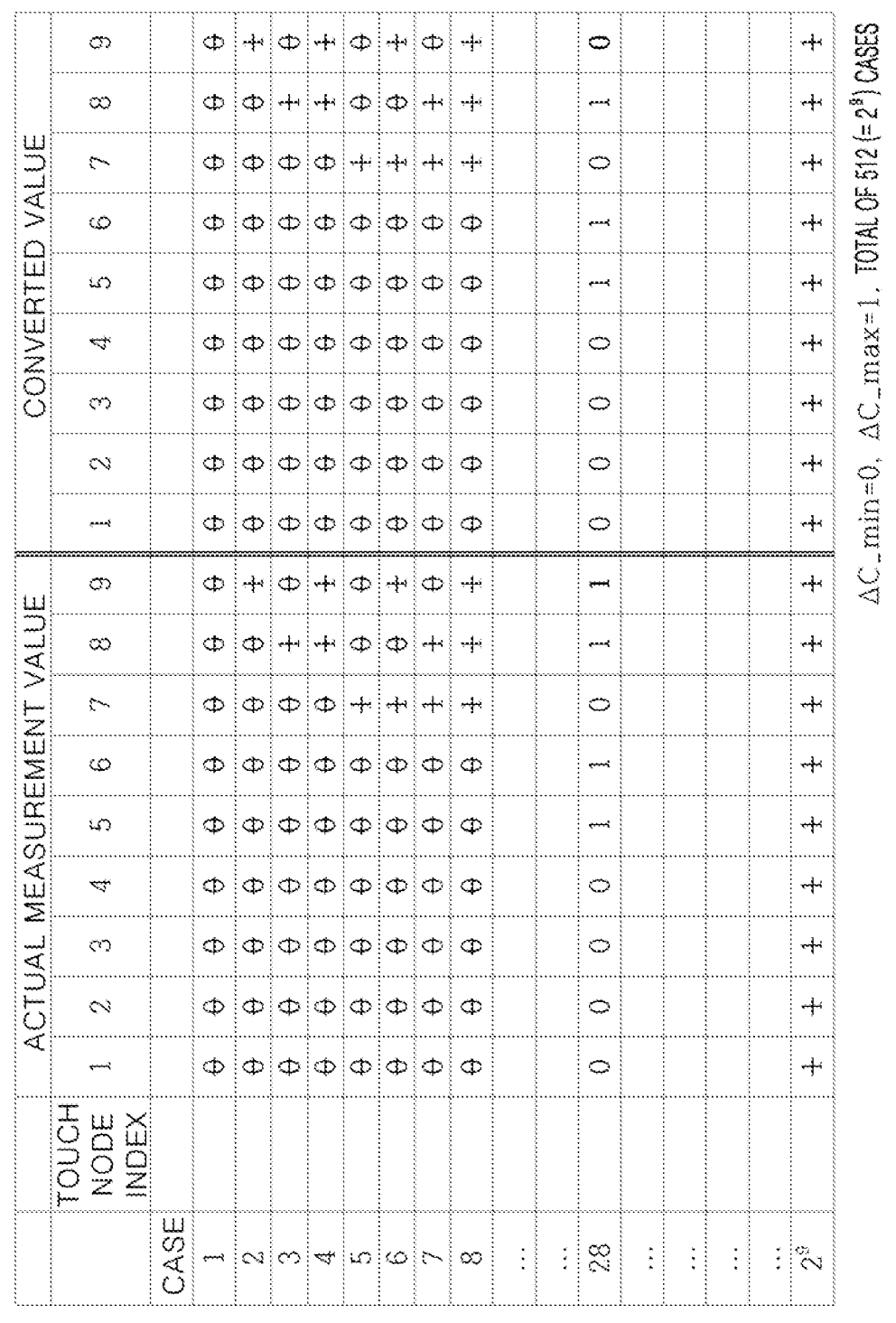

FIG. 7 is a variation to FIG. 6 and represents when a variation to a 1 bit resolution has been performed in order to decrease a table search time even though a value representing an amount of capacitance variation at each touch node is actually provided as a e.g., 2 bit resolution.

FIG. 8 is a flowchart of a method of determining a touch input position according to an embodiment of the present invention. In the following, descriptions are provided with reference to FIGS. 1, 3, and 4.

In step S11, it is possible to determine a touch node at which the amount of variation of capacitance is the greatest.

Next, it is possible to calculate a first micro touch position by a predetermined rule (e.g., f( )) by using an amount of variation of capacitance at the determined touch node 5 and touch nodes 1 to 4 and 6 to 9 therearound in step S12.

Next, it is possible to perform a scheduled subsequent process by using the first micro touch position calculated, in step S13. For example, a specific output may be performed at a first display pixel corresponding to the first micro touch position.

Next, it is possible to search for, from a predetermined table (see FIG. 4), a second micro touch position corresponding to combinations of amounts of variation of capacitance at the determined touch node 5 and touch nodes 1 to 4 and 6 to 9 therearound in step S14. Step S14 is performed in order to correct an inaccurate output value by f( ) in step S12, when an output value by f( ) in step S12 is inaccurate.

Next, it is possible to correct and then re-perform the scheduled subsequent process by using the second micro touch position searched, in step S15. For example, the specific output from the first display pixel corresponding to the first micro touch position in step S13 is cancelled and at the same time, the specific output may be output from a second display pixel corresponding to the second micro touch position searched in step S14. That is, the output in step S13 may be replaced with the output in step S15.

In the flowchart of FIG. 8, the first micro touch position and the second micro touch position, i.e., a total of two micro touch positions are detected for a single touch input, which is to perform the subsequent process with the erroneous result value of f( ) when it is difficult to process the subsequent process in real time because a search time for the table in FIG. 4 is long and then correct the subsequent process with an accurate result value using the table in FIG. 4 in step S15.

FIG. 9 is a variation to the flowchart of FIG. 8 and may be applied when a search time consumed to search for a corresponding case from the table of FIG. 4 is sufficiently short and thus it is possible to perform the subsequent process in real time. That is, in FIG. 9, steps S12 and S13 in FIG. 8 are omitted.

While methods by the flowcharts in FIGS. 8 and 9 use the tables in FIGS. 4 and 5, other methods using the tables in FIGS. 6 and 7 are represented in FIGS. 10 and 11.

FIG. 10 is a flowchart of a method of determining a touch input position according to another embodiment of the present invention. In the following, descriptions are provided with reference to FIGS. 1, 3, and 6.

In step S21, it is possible to determine a touch node 5 at which the amount of capacitance variation is the greatest.

Next, it is possible to calculate a first micro touch position by a predetermined rule (e.g., f( )) by using an amount of variation of capacitance at the determined touch node 5 and touch nodes 1 to 4 and 6 to 9 therearound in step S22.

Next, it is possible to perform a scheduled subsequent process by using the first micro touch position calculated, in step S23. For example, a specific output may be performed at a first display pixel corresponding to the first micro touch position.

Next, it is possible to search for, from a predetermined table (see FIG. 6), corrected amounts of variation corresponding to the amounts of variation of capacitance in step S24. Step S24 is performed in order to correct an inaccurate output value by f( ) in step S22, when an output value by f( ) in step S22 is inaccurate.

Next, it is possible to calculate a second micro touch position by the predetermined rule f( ) by using the corrected amounts of variation in step S25.

Next, it is possible to correct and then re-perform the scheduled subsequent process by using the second micro touch position calculated, in step S26. For example, the specific output from the first display pixel corresponding to the first micro touch position in step S23 is cancelled and at the same time, the specific output may be output from a second display pixel corresponding to the second micro touch position calculated in step S25.

FIG. 11 is a variation to the flowchart of FIG. 10 and may be applied when a search time consumed to search for a corresponding case from the table of FIG. 6 is sufficiently short and thus it is possible to perform the subsequent process in real time.

FIG. 12 is a diagram for explaining the effect of a method of determining a touch input position according to an embodiment of the present invention.

When a touch input drawing a straight line in the arrow direction is performed on a touch panel coupled to a display device as shown in FIG. 12a, there may need to display a line extended along a touch input path on the display device. In this case, there is non-linearity related to a touch input characteristic in at least a portion 95 of the touch panel and when f( ) as described above is used, a curved line not following the touch input like the portion 95 in FIG. 12b may also be displayed on the display device.

In this case, according to the method of FIG. 9 or 11, the error of the portion 95 having non-linearity related to the touch input is corrected so that the shape of a straight line as shown in FIG. 12a may be immediately displayed on the display device. In addition, according to the method of FIG. 8 or 10, the shape of an erroneous line as shown in FIG. 12b is displayed on the display device and then the line may be corrected to the shape of an error-corrected straight line as shown in FIG. 12 and then output.

In the following, according to an embodiment of the present invention, a touch input position determination method by which a touch input position is determined on a touch panel including a plurality of touch nodes (see FIG. 1) is described with reference to FIGS. 1, 3, and 4.

The method may include obtaining a first combination of variation values of capacitance at a central touch node 5 and one or more surrounding touch nodes 1 to 4, and 6 to 9 around the central touch node 5 (e.g., [0,0,0,0,1,1,0,1,1] in 'case 278' in FIG. 4); obtaining first information mapped to the first combination (e.g., '66' in 'case 278' in FIG. 4) from possible combinations capable of being made up of capacitance variation values at the central touch node 5 and the surrounding touch nodes 1 to 4, and 6 to 9 and a table (e.g., FIG. 4) including information mapped to the possible combinations; and determining a touch input position (e.g., display pixel 66 in FIG. 3b) by using the first information obtained.

In this case, the central touch node 5 may be a touch at which the amount of variation of capacitance is the greatest among the plurality of touch nodes in FIG. 1.

In this case, a first special resolution of the touch input position may be higher than a second spatial resolution by the touch nodes. In this example, the first spatial resolution may be a screen resolution of display pixels in e.g., FIG. 3b. In addition, the second spatial resolution may be a resolution identified by the touch nodes in FIG. 3a. It is possible to understand that the first spatial resolution and the second spatial resolution are conceptually different from the resolution representing an amount of variation of capacitance as described above. Also, the first spatial resolution may also have a value between the screen resolution of the display pixels in FIG. 3b and the second spatial resolution.

In this example, each piece of information mapped to each of the possible combinations may be information on the touch input position. In particular, the information on the touch input position may be the index of each display pixel in e.g., FIG. 3b.

Alternatively, each piece of information mapped to each of the possible combinations may be a capacitance variation value that is corrected from a capacitance variation value in each combination (see case 285 in FIG. 6).

A device for determining a touch input position provided according to another embodiment of the present invention may include a sensing unit obtaining a variation value of capacitance at a plurality of touch nodes, and a processor providing a touch input position by using a result obtained from the sensing unit. The sensing unit may correspond to reference numeral 303 in FIG. 13 and the processor may correspond to reference numeral 304 in FIG. 13.

FIG. 13 represents an example of an electronic device using a conductor pattern according to an embodiment of the present invention.

An electronic device 3100 may receive an input signal through a touch panel 301. The touch panel 301 may include a substrate on which an electrode pattern is formed in the form of a matrix. The electronic device 3100 may include a touch panel 301 configured to be capable of transmitting a touch input signal, a touch panel control device 303 outputting a signal for driving the touch panel 301 and receiving an input signal from the touch panel 301, a voltage driver 302 receiving a touch panel driving signal from the touch panel control device 303 to generate a touch panel driving voltage, a main processor 304 receiving a touch input signal from the touch panel control device 303 to execute a program stored in a storage device 305, the storage device 305 storing one or more programs executed according to the touch input signal, and a display device 306 displaying a result processed by the main processor 306. The display device 306 and the touch panel 301 may overlap.

The touch panel control device 303 may include a touch sensing unit sensing a signal input from the touch panel 301, a panel driving unit generating a touch panel driving signal to be capable of transmitting the input signal to the touch panel 301, and a touch panel processor controlling them. The touch panel processor may be a re-programmable processor or a processor of a type operating by a dedicated logic such as a state machine.

The electronic device 3100 may include a RAM or storage devices of other types and may further include another device such as watchdog, though not shown.

Although exemplary embodiments of the present invention have been described, a person skilled in the art to which the present invention pertains may easily implement various variations and modifications without departing from the essential characteristic of the present invention.

Therefore, disclosed embodiments should be considered as illustrative but not limitative and the true scope of the present invention is represented in the following claims and not the detailed description as described earlier and all differences within the scope equivalent thereto should be construed as included in the present invention.

The invention claimed is:

1. A method of determining a touch input position, the method comprising;
    obtaining a table comprising possible combinations comprised of capacitance variation values at a plurality of touch nodes which are disposed adjacent to each other and information mapped to the possible combinations;
    obtaining a first combination of capacitance variation values at the plurality of touch nodes generated by a touch input;
    obtaining first information mapped to the first combination by searching for the first combination among the possible combinations from the table; and
    determining an input position according to the touch input by using the first information obtained,
    wherein,
    each column of the table represents each of the plurality of touch nodes, and
    each row of the table represents each of the possible combinations.

2. The method of claim 1, wherein the plurality of touch nodes comprises a single central touch node and one or more surrounding touch nodes adjacent to the central touch node, wherein the central touch node is a touch node at which an amount of capacitance variation is the greatest among the plurality of touch nodes.

3. The method of claim 1, wherein each piece of information mapped to each of the possible combinations is a coordinate of the input position according to the touch input.

4. The method of claim 1, wherein each piece of information mapped to each of the possible combinations is a corrected set of capacitance variation values corrected from capacitance variation values configuring the each of the possible combinations.

5. A method for determining a touch input position for a touch panel comprising a plurality of touch nodes, the method comprising:
    obtaining a first combination related to capacitance variation values at a central touch node and one or more surrounding touch nodes adjacent to the central touch node;
    obtaining first information mapped to the first combination from a table comprising possible combinations comprised of capacitance variation values at the central touch node and the surrounding touch nodes and information mapped to the possible combinations; and
    determining a touch input position by using the first information obtained,
    wherein,
    each column of the table represents each of the central touch node and the one or more surrounding touch nodes, and
    each row of the table represents each of the possible combinations.

6. The method of claim 5, wherein each piece of information mapped to each of the possible combinations is a coordinate of the touch input position, and the mapping of each piece of information to each combination comprises:
    a first step sensing a touch input targeting to a specific position on the touch panel; and
    mapping, capacitance variation values of at least some of touch nodes of the touch panel output as a result of the first step, to the specific position.

7. The method of claim 5, wherein each piece of information mapped to each of the possible combinations is a corrected set of capacitance variation values corrected from capacitance variation values configuring the each of the possible combinations, and the mapping of each piece of information to each combination comprises:
    a first step sensing a touch input targeting to a specific position on the touch panel; and
    mapping capacitance variation values of at least some of touch nodes of the touch panel output as a result of the first step, to a set of corrected values that enables a function f( ) to output an accurate touch input position when the set of corrected values are input to the function f( ) as independent variables.

8. A device for determining a touch input position, the device comprising;
    a sensing unit configured to obtain capacitance variation values at a plurality of touch nodes; and
    a processor configured to provide a touch input position by using a result obtained from the sensing unit, wherein the processor is configured to
    obtain a table comprising possible combinations comprised of capacitance variation values at a plurality of touch nodes and information mapped to the possible combinations;
    obtain a first combination of capacitance variation values at the plurality of touch nodes generated by a touch input;
    obtain first information mapped to the first combination by searching for the first combination among the possible combinations from the table; and
    determine an input position according to the touch input by using the first information obtained,
    wherein,
    each column of the table represents each of the central touch node and the one or more surrounding touch nodes, and each row of the table represents each of the possible combinations.

9. The device of claim 8, wherein each piece of information mapped to each of the possible combinations is a coordinate of the input position.

10. The device of claim 8, wherein each piece of information mapped to each of the possible combinations is a corrected set of capacitance variation values corrected from capacitance variation values configuring the each of the possible combinations.

* * * * *